US007011869B2

(12) United States Patent
Emch

(10) Patent No.: US 7,011,869 B2
(45) **Date of Patent: *Mar. 14, 2006**

(54) MULTI-STAGE PROCESSES FOR COATING SUBSTRATES WITH MULTI-COMPONENT COMPOSITE COATING COMPOSITIONS

(75) Inventor: Donaldson J. Emch, Goodrich, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/653,335

(22) Filed: Sep. 2, 2003

(65) Prior Publication Data

US 2004/0043156 A1 Mar. 4, 2004

Related U.S. Application Data

(63) Continuation-in-part of application No. 10/294,954, filed on Nov. 14, 2002, now Pat. No. 6,863,935, which is a continuation-in-part of application No. 09/840,573, filed on Apr. 23, 2001, now Pat. No. 6,579,575, which is a continuation-in-part of application No. 09/320,264, filed on May 26, 1999, now Pat. No. 6,221,441.

(51) Int. Cl.

| | |
|---|---|
| ***B05D 1/38*** | (2006.01) |
| ***B05D 3/02*** | (2006.01) |
| ***B05D 3/04*** | (2006.01) |
| ***C08J 7/18*** | (2006.01) |
| ***G08F 2/46*** | (2006.01) |

(52) U.S. Cl. ...................... 427/542; 427/521; 427/202; 427/378; 427/379; 427/388.1; 427/409; 427/492; 427/493

(58) Field of Classification Search ................ 427/521, 427/542, 189, 202, 203, 205, 378, 379, 380, 427/384, 386, 388.1, 410, 409
See application file for complete search history.

(56) References Cited

U.S. PATENT DOCUMENTS 1,998,615 A 4/1935 Groven .......................... 91/70

(Continued)

FOREIGN PATENT DOCUMENTS

DE 19642970 4/1997

(Continued)

OTHER PUBLICATIONS

"Infrared Flash Oven" Brochure, BGK Automotive Group © 1989, no month or other date given.

(Continued)

*Primary Examiner*—Marianne Padgett
(74) *Attorney, Agent, or Firm*—Deborah M. Altman

(57) ABSTRACT

A process for coating a substrate is provided which includes the following steps:

(a) applying a waterborne base coat composition to a surface of the substrate;
(b) applying infrared radiation at a power density of 1.5–30.0 $kW/m^2$ and a first air stream simultaneously to the base coat composition such that a pre-dried base coat is formed upon the surface of the substrate; and
(c) applying a second air stream in the absence of infrared radiation to the base coat composition such that a dried base coat is formed upon the surface of the substrate.

Various embodiments of the invention are disclosed including continuous, batch, and semi-batch processes, which may include additional process steps, such as subsequent application of a topcoat. The process may be used to coat a variety of metal and polymeric substrates, for example, those associated with the body of a motor vehicle.

35 Claims, 3 Drawing Sheets

U.S. PATENT DOCUMENTS

| | | | | |
|---|---|---|---|---|
| 2,377,946 A | | 6/1945 | Leary | 18/19 |
| 2,387,516 A | | 10/1945 | Kaminski | 219/34 |
| 2,472,293 A | | 6/1949 | Groven | 34/60 |
| 2,478,001 A | | 8/1949 | Miskella | 219/35 |
| 2,498,339 A | | 2/1950 | Miskella | 91/55 |
| 2,876,135 A | | 3/1959 | Levine | 117/76 |
| 3,151,950 A | | 10/1964 | Newman et al. | 34/4 |
| 3,455,806 A | | 7/1969 | Spoor et al. | 204/181 |
| 3,591,767 A | | 7/1971 | Mudie | 219/354 |
| 3,731,051 A | | 5/1973 | Ellersick | 219/162 |
| 3,749,657 A | | 7/1973 | Le Bras et al. | 204/181 |
| 3,953,643 A | | 4/1976 | Cheung et al. | 428/220 |
| 3,953,644 A | | 4/1976 | Camelon et al. | 428/220 |
| 3,998,716 A | | 12/1976 | Masar et al. | 204/181 |
| 4,259,566 A | | 3/1981 | Kobayashi | 219/222 |
| 4,265,936 A | | 5/1981 | Prohaska, Jr. | 427/140 |
| 4,336,279 A | | 6/1982 | Metzger | 427/55 |
| 4,349,724 A | | 9/1982 | Ellersick | 219/347 |
| 4,389,970 A | | 6/1983 | Edgerton | 118/666 |
| 4,390,564 A | | 6/1983 | Kimble | 427/35 |
| 4,403,003 A | | 9/1983 | Backhouse | 427/407.1 |
| 4,416,068 A | | 11/1983 | Nilsson et al. | 34/4 |
| 4,423,312 A | | 12/1983 | Wiedenfeld et al. | 219/388 |
| 4,461,094 A | | 7/1984 | Schnalke | 34/9 |
| 4,535,548 A | | 8/1985 | Hyde | 34/4 |
| 4,546,553 A | | 10/1985 | Best | 34/39 |
| 4,594,266 A | | 6/1986 | Lemaire et al. | 427/55 |
| 4,731,290 A | | 3/1988 | Chang | 428/335 |
| 4,771,728 A | | 9/1988 | Bergman, Jr. | 118/642 |
| 4,820,555 A | | 4/1989 | Kuwajima et al. | 427/407.1 |
| 4,822,685 A | | 4/1989 | Perez et al. | 428/423.3 |
| 4,891,111 A | | 1/1990 | McCollum et al. | 204/181.7 |
| 4,894,261 A | | 1/1990 | Gulbins et al. | 427/379 |
| 4,907,533 A | | 3/1990 | Nelson et al. | 118/663 |
| 4,908,231 A | | 3/1990 | Nelson et al. | 427/55 |
| 4,933,056 A | | 6/1990 | Corrigan et al. | 204/181.7 |
| 4,943,447 A | | 7/1990 | Nelson et al. | 427/55 |
| 4,971,837 A | | 11/1990 | Martz et al. | 422/388.2 |
| 4,988,537 A | * | 1/1991 | Tanimoto et al. | 427/543 |
| 5,050,232 A | | 9/1991 | Bergman et al. | 392/412 |
| 5,075,132 A | | 12/1991 | Ogasawara | 427/55 |
| 5,137,972 A | | 8/1992 | Cook | 525/123 |
| 5,196,485 A | | 3/1993 | McMonigal et al. | 525/327.3 |
| 5,323,485 A | | 6/1994 | Josefsson et al. | 392/417 |
| 5,335,308 A | | 8/1994 | Sorensen | 392/412 |
| 5,338,578 A | | 8/1994 | Leach | 427/470 |
| 5,340,089 A | | 8/1994 | Heath et al. | 266/87 |
| RE34,730 E | | 9/1994 | Salatin et al. | 427/407.1 |
| 5,401,790 A | | 3/1995 | Poole et al. | 524/199 |
| 5,407,747 A | | 4/1995 | Sammel et al. | 428/418 |
| 5,425,970 A | | 6/1995 | Lahrmann et al. | 427/493 |
| 5,427,822 A | | 6/1995 | Bracciano | 427/424 |
| 5,453,295 A | | 9/1995 | Sammel et al. | 427/195 |
| 5,486,384 A | | 1/1996 | Bastian et al. | 427/493 |
| 5,492,731 A | | 2/1996 | Temple et al. | 427/407.1 |
| 5,551,670 A | | 9/1996 | Heath et al. | 266/87 |
| 5,556,527 A | | 9/1996 | Igarashi et al. | 204/488 |
| 5,612,095 A | | 3/1997 | Brock et al. | 427/407.1 |
| 5,614,271 A | | 3/1997 | Shibuya et al. | 427/541 |
| 5,635,302 A | | 6/1997 | Budde et al. | 428/461 |
| 5,654,037 A | | 8/1997 | Moore et al. | 427/379 |
| 5,698,310 A | | 12/1997 | Nakamura et al. | 428/328 |
| 5,709,909 A | | 1/1998 | Leibfarth et al. | 427/407.1 |
| 5,716,678 A | | 2/1998 | Rockrath et al. | 427/407.1 |
| 5,760,107 A | | 6/1998 | Valko et al. | 523/404 |
| 5,820,933 A | | 10/1998 | Carroll | 427/314 |
| 5,820,987 A | | 10/1998 | Kaufman et al. | 428/413 |
| 5,871,809 A | | 2/1999 | Liedtke et al. | 427/140 |
| 5,888,592 A | | 3/1999 | Biallas et al. | 427/542 |
| 6,280,800 B1 | * | 8/2001 | Thiele et al. | 427/508 |
| 6,432,490 B1 | * | 8/2002 | Rekowski et al. | 427/508 |
| 2005/0112286 A1 | * | 5/2005 | Nguyen et al. | 427/384 |

FOREIGN PATENT DOCUMENTS

| | | |
|---|---|---|
| EP | 0038127 | 3/1981 |
| EP | 0148718 | 11/1984 |
| EP | WO 98/40170 | 9/1998 |
| GB | 2091859 | 8/1982 |

OTHER PUBLICATIONS

"Heated Flash Technical Specifications", General Motors NAO Paint Genral Technical Specifications Document No. 34909 (Jan. 14, 1997).

"Specifications for Heated Flash Off for Water-Borne Basecoat Application", Ford Motor Co. Body and Assembly Operations Sec. 240 (Jan. 15, 1995).

"The Proof Is In The Heating", Industrial Energy Efficiency Centre, U.K., HQ4ID (Apr. 25, 19996).

R. Hampshire "The Use of Radiant Heat Transfer in the Curing of Coatings on Complex Geometrics and Problematic Substrates", Interfinish 1996 World Congress, Birmingham, UK (Sep. 1996).

W. Veenstra et al., "IRK Halogen Infrared Radiators in the Industrial Heating Process", Philips Lighting, Eindhoven, Netherlands, no date.

"Powder Coatings", Blasdel Equipment Infrared Ovens http://blasdelent.com/powder.html (Mar. 12, 1999).

"Gas Infrared Ovens", Thermovation Engineering Inc. http://www.thomasregister.com/olc/thermovation/gas.htm (Mar. 12, 1999).

"Combination Ovens for Curing of Powder Coatings", IUT, no date.

* cited by examiner

MULTI-STAGE PROCESSES FOR COATING SUBSTRATES WITH MULTI-COMPONENT COMPOSITE COATING COMPOSITIONS

CROSS-REFERENCE TO RELATED APPLICATIONS

This application is a continuation-in-part of U.S. patent application Ser. No. 10/294,954, filed Nov. 14, 2002, now U.S. Pat. No. 6,863,935 entitled "Multi-Stage Processes for Coating Substrates with Multi-Component Composite Coating Compositions", which in turn is a continuation-in-part of U.S. patent application Ser. No. 09/840,573, filed Apr. 23, 2001, entitled "Multi-Stage Processes for Coating Substrates with Liquid Basecoat and Powder Topcoat", now U.S. Pat. No. 6,579,575, which in turn is a continuation-in-part of U.S. patent application Ser. No. 09/320,264, filed May 26, 1999, now U.S. Pat. No. 6,221,441, also entitled "Multi-Stage Processes for Coating Substrates with Liquid Basecoat and Powder Topcoat".

FIELD OF THE INVENTION

The present invention relates to drying of liquid base coats and, more particularly, to multi-stage processes for applying multi-component composite coating compositions including application of pigmented or colored base coats that are dried using a combination of infrared and convection drying, followed by subsequent overcoating with transparent or clear topcoats.

BACKGROUND OF THE INVENTION

In the manufacturing of automobile bodies, multi-component composite coating compositions are applied to vehicle substrates using multiple layers of coatings, including electrophoretically applied primers, one or more primer surfacers, and various color coats and/or clear coats. These coatings not only enhance the appearance of the automobile, but also provide protection from corrosion, chipping, ultraviolet light, acid rain, and other environmental conditions which can deteriorate the coating appearance and damage or corrode the underlying car body substrate.

The formulations of these coatings can vary widely and, hence, the drying and curing conditions may differ for each coating layer, depending on the cure chemistry of the ingredients and the nature of any carrier solvents. Waterborne coatings are becoming more commonplace, and drying conditions are different than for conventional solvent-borne systems. A major challenge that faces all automotive manufacturers is how to dry and cure these coatings rapidly during vehicle production with minimal capital investment and floor space, which is valued at a premium in manufacturing plants.

Various ideas have been proposed to speed drying and curing processes for automobile coatings, such as hot air convection drying. While hot air drying is rapid, a skin can form on the surface of the coating, which impedes the escape of volatiles from the coating composition and causes pops, bubbles, or blisters which ruin the appearance of the dried coating.

Other methods and apparatus for drying and curing a coating applied to an automobile body are disclosed in U.S. Pat. Nos. 4,771,728; 4,907,533; 4,908,231; and 4,943,447 in which the automobile body is heated with radiant heat for a time sufficient to set the coating on Class A surfaces of the body and subsequently the coating is cured with heated air.

U.S. Pat. No. 4,416,068 discloses a method and apparatus for accelerating the drying and curing of refinish coatings for automobiles using infrared radiation. Ventilation air used to protect the infrared radiators from solvent vapors is discharged as a laminar flow over the car body. FIG. 15 is a graph of temperature as a function of time showing the preferred high temperature/short drying time (curve 122) versus conventional infrared drying (curve 113) and convection drying (curve 114). Such rapid, high temperature drying techniques can be undesirable because a skin can form on the surface of the coating that can cause pops, bubbles, or blisters as discussed above.

U.S. Pat. No. 4,336,279 discloses a process and apparatus for drying automobile coatings using direct radiant energy, a majority of which has a wavelength greater than 5 microns. Heated air is circulated under turbulent conditions against the back sides of the walls of the heating chamber to provide the radiant heat. Then, the heated air is circulated as a generally laminar flow along the inner sides of the walls to maintain the temperature of the walls and remove volatiles from the drying chamber. As discussed at column 7, lines 18–22, air movement is maintained at a minimum in the central portion of the inner chamber in which the automobile body is dried.

U.S. Pat. Nos. 6,113,764; 6,200,650; 6,221,441; 6,231,932; and 6,291,027 disclose multi-stage processes for drying and curing electrodeposited coatings, primers, base coats, and topcoats using various combinations of air drying and infrared radiation.

A rapid, multi-stage drying process for automobile coatings is needed which inhibits formation of surface defects and discoloration in the coating, particularly for use with waterborne base coats to be overcoated with a clear topcoat.

SUMMARY OF THE INVENTION

In accordance with the present invention a process for coating a substrate is provided, which includes the following steps:

(a) applying a waterborne base coat composition to a surface of the substrate;

(b) applying infrared radiation at a power density of 1.5–30.0 kW/$m^2$ and a first air stream simultaneously to the base coat composition such that a pre-dried base coat is formed upon the surface of the substrate; and (c) applying a second air stream in the absence of infrared radiation to the base coat composition such that a dried base coat is formed upon the surface of the substrate.

Various embodiments of the invention are also provided, including continuous, batch, and semi-batch processes. Additional process steps, such as subsequent application of a topcoat, may be included. The process may be used to coat a variety of substrates, for example, those associated with the body of a motor vehicle.

A particular embodiment of the invention is a semi-batch process for coating a substrate, comprising the steps of:

(a) in a first location, applying a waterborne base coat composition to a surface of the substrate;

(b) transporting the substrate to a second location and applying infrared radiation at a power density of 1.5–30.0 kW/$m^2$ and a first air stream simultaneously to the base coat composition for a period of 30 to 60 seconds such that a pre-dried base coat is formed upon the surface of the substrate; and (c) in the same second location, applying infrared radiation at a power density of 3.0 to 30.0 kW/$m^2$ and a second air stream simultaneously to the base coat composition for a period of 30 to 90 seconds such that a dried base coat is formed upon the surface of the substrate.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

Other than in the operating examples, or where otherwise indicated, all numbers expressing quantities of ingredients, reaction conditions, and so forth, used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10; that is, having a minimum value equal to or greater than 1 and a maximum value of equal to or less than 10.

Figure 1:
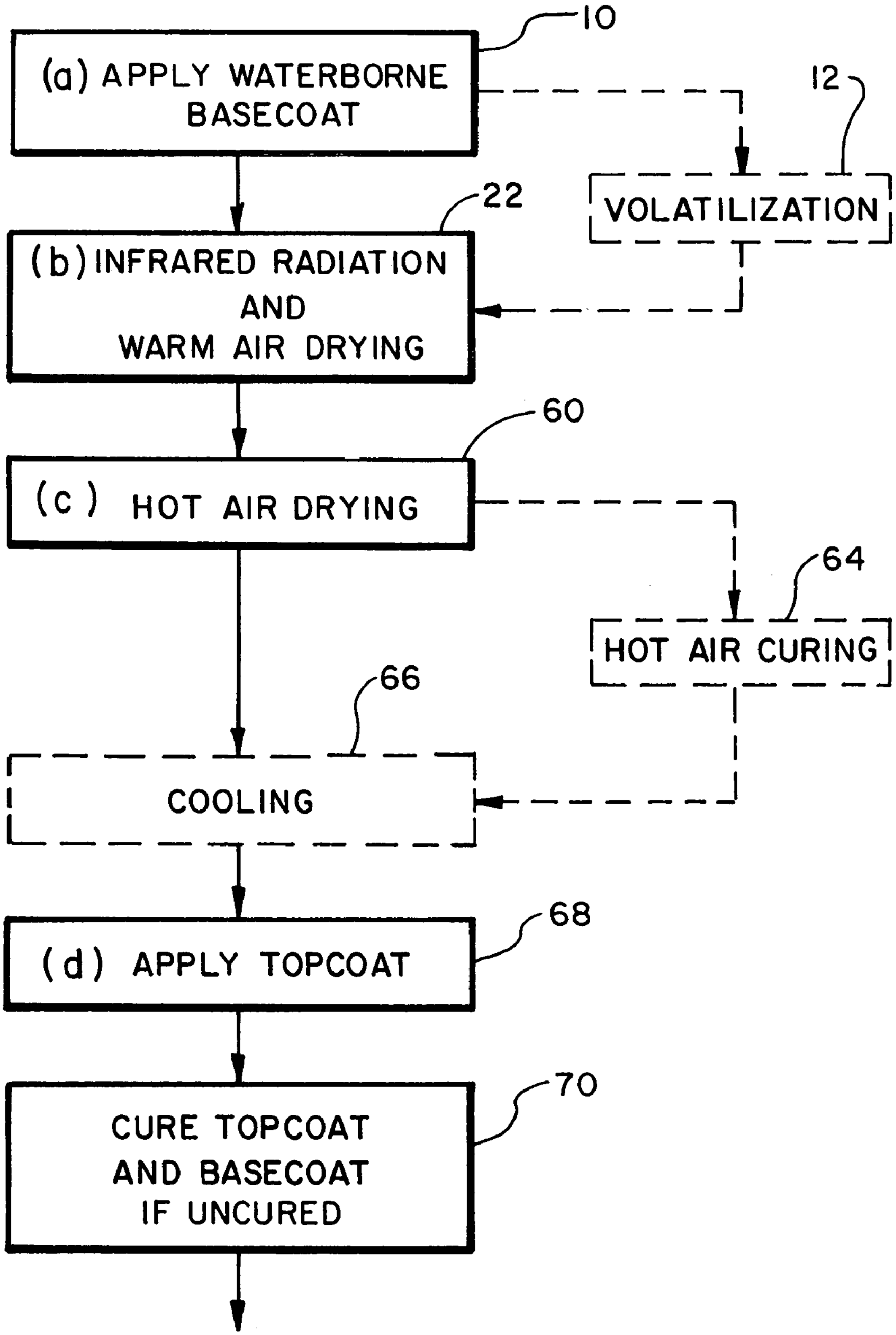
FIG. 1 is a flow diagram of a multi-stage process for applying multi-component composite coating compositions to a substrate, according to the present invention.

Referring to the drawings, in which like numerals indicate like elements throughout, there is shown in FIG. 1 a flow diagram of a multi-stage process for coating a substrate according to the present invention.

The process according to the present invention is suitable for coating metal or polymeric substrates in a batch, semi-batch, or continuous process. In a batch process, the substrate is stationary during each treatment step of the process, whereas in a continuous process the substrate is in continuous movement along an assembly line to different locations. In a semi-batch process, the substrate may remain stationary in a single location for one or more steps in the process, and move along the assembly line for other process steps. The present invention will now be discussed generally in the context of coating a substrate in a continuous assembly line process.

Substrates to be coated by the process of the present invention typically include metal substrates, such as iron, aluminum, including alloys listed below, steel, by which is meant steel and steel alloys, and steel surface-treated with any of zinc metal, zinc compounds and zinc alloys (including electrogalvanized steel, hot-dipped galvanized steel, GALVANNEAL steel, and steel plated with zinc alloy). Also, copper, magnesium, zinc and alloys thereof, and zinc-aluminum alloys such as GALFAN, GALVALUME, may be used. "Steel" also includes aluminum-plated steel and aluminum alloy-plated steel substrates, and steel substrates (such as cold rolled steel or any of the steel substrates listed above) coated with a weldable, zinc-rich or iron phosphide-rich organic coating. Such weldable coating compositions are disclosed in U.S. Pat. Nos. 4,157,924 and 4,186,036.

Thermoset and thermoplastic polymeric substrates may also be used. Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, ethylene propylene diene monomer (EPDM) rubber, copolymers and mixtures thereof.

Preferably, the substrates are used as components to fabricate automotive vehicles, including but not limited to automobiles, trucks, and tractors. The substrates can have any shape, but are preferably in the form of automotive body components, such as bodies (frames); body panels including roofs, hoods, doors, and fenders; heavy metal rocker areas, bumpers, and/or trim for automotive vehicles.

The present invention first will be discussed generally in the context of coating a metallic automobile body. One skilled in the art would understand that the process of the present invention also is useful for coating non-automotive metal and/or polymeric components.

Prior to treatment according to the process of the present invention, the metal substrate can be cleaned and degreased and a pretreatment coating, such as CHEMFOS 700 zinc phosphate or BONAZINC zinc-rich pretreatment (each commercially available from PPG Industries, Inc. of Pittsburgh, Pa.), can be deposited upon the surface of the metal substrate. Alternatively or additionally, an electrodepositable coating composition can be electrodeposited upon at least a portion of the metal substrate. Useful electrodeposition methods and electrodepositable coating compositions include conventional anionic or cationic electrodepositable coating compositions, such as epoxy or polyurethane-based coatings discussed in U.S. Pat. Nos. 5,530,043; 5,760,107; 5,820,987; and 4,933,056.

Figure 2:
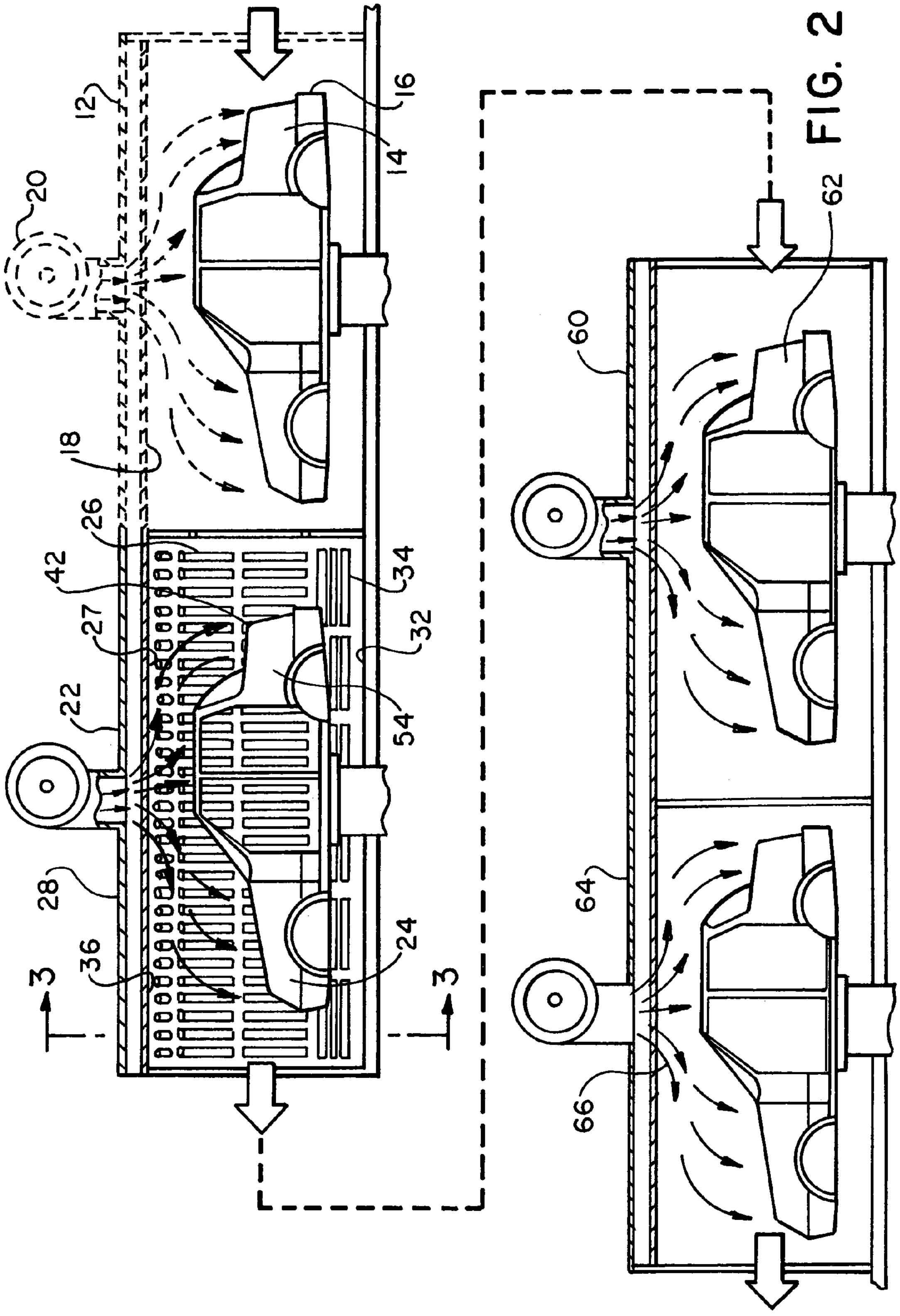
FIG. 2 is a side elevational schematic diagram of a portion of the process of FIG. 1.

In the first step (a) of the process of the present invention, designated 10 in FIG. 1, a waterborne base coat composition is applied to a surface of the substrate (automobile body 16 as shown in FIG. 2), typically over an electrodeposited coating as described above. The base coat can be applied to the surface of the substrate in step (a) by any suitable coating process well known to those skilled in the art, for example by dip coating, direct roll coating, reverse roll coating, curtain coating, spray coating, brush coating, and combinations thereof. The method and apparatus for applying the base coat composition to the substrate is determined in part by the configuration and type of substrate material.

The waterborne base coat composition comprises a film-forming material or binder, water as a carrier, and optionally pigment. Preferably, the base coat composition is a crosslinkable coating composition comprising at least one thermosettable film-forming material, such as acrylics, polyesters (including alkyds), polyurethanes and epoxies, and at least one crosslinking material. Thermoplastic film-forming materials, such as polyolefins, also can be used. The amount of film-forming material in the base coat generally ranges from about 40 to about 97 weight percent based on the total weight of solids in the base coat composition.

Suitable acrylic polymers include copolymers of one or more of acrylic acid, methacrylic acid, and alkyl esters thereof, such as methyl methacrylate, ethyl methacrylate, hydroxyethyl methacrylate, butyl methacrylate, ethyl acrylate, hydroxyethyl acrylate, butyl acrylate, and 2-ethylhexyl acrylate, optionally together with one or more other polymerizable ethylenically unsaturated monomers including vinyl aromatic compounds such as styrene and vinyl toluene, nitriles such as acrylonitrile and methacrylonitrile, vinyl and vinylidene halides, and vinyl esters such as vinyl acetate. Other suitable acrylics and methods for preparing the same are disclosed in U.S. Pat. No. 5,196,485 at column 11, lines 16–60.

Polyesters and alkyds are other examples of resinous binders useful for preparing the base coat composition. Such polymers can be prepared in a known manner by condensation of polyhydric alcohols, such as ethylene glycol, propylene glycol, butylene glycol, 1,6-hexylene glycol, neopentyl glycol, trimethylolpropane and pentaerythritol, with polycarboxylic acids, such as adipic acid, maleic acid, fumaric acid, phthalic acids, trimellitic acid or drying oil fatty acids.

Polyurethanes also can be used as the resinous binder of the base coat. Useful polyurethanes include the reaction products of polymeric polyols, such as polyester polyols or acrylic polyols, with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate).

Suitable crosslinking materials include aminoplasts, polyisocyanates, polyacids, polyanhydrides, and mixtures thereof. Useful aminoplast resins are based on the addition products of formaldehyde, with an amino- or amido-group carrying substance. Condensation products obtained from the reaction of alcohols and formaldehyde with melamine, urea or benzoguanamine are most common. Useful polyisocyanate crosslinking materials include blocked or unblocked polyisocyanates, such as those discussed above for preparing the polyurethane. Examples of suitable blocking agents for the polyisocyanates include lower aliphatic alcohols such as methanol, oximes such as methyl ethyl ketoxime, and lactams such as caprolactam. The amount of the crosslinking material in the base coat composition generally ranges from about 5 to about 50 weight percent on a basis of total resin solids weight of the base coat composition.

The solids content of the waterborne base coat composition generally ranges from about 18 to about 50 weight percent, and usually about 20 to about 40 weight percent.

The base coat composition can further comprise one or more pigments or other additives, such as UV absorbers, rheology control agents or surfactants. Useful metallic pigments include aluminum flake, bronze flakes, coated mica, nickel flakes, tin flakes, silver flakes, copper flakes, and combinations thereof. Other suitable pigments include mica, iron oxides, lead oxides, carbon black, titanium dioxide, and colored organic pigments such as phthalocyanines. The specific pigment to binder ratio can vary widely so long as it provides the requisite hiding at the desired film thickness and application solids.

Suitable waterborne base coats for use in the process of the present invention include those disclosed in U.S. Pat. Nos. 4,403,003; 5,401,790; and 5,071,904. Also, waterborne polyurethanes, such as those prepared in accordance with U.S. Pat. No. 4,147,679, can be used as the resinous film former in the base coat.

The dry film thickness of the base coat composition applied to the substrate can vary based upon such factors as the type of substrate and intended use of the substrate, i.e., the environment in which the substrate is to be placed and the nature of the contacting materials. Generally, the thickness of the base coat composition applied to the substrate ranges from about 5 to about 38 micrometers and, more preferably, about 12 to about 30 micrometers.

Referring now to FIG. 1, immediately following the application of the base coat, an air stream may optionally be applied in step 12 to the base coat composition for a period of at least 30 seconds to volatilize at least a portion of volatile material from the base coat composition, allowing the base coat to "set". As used herein, the term "set" means that the base coat is tack-free (resists adherence of dust and other airborne contaminants) and is not disturbed or marred (waved or rippled) by air currents which blow past the base coated surface. The velocity of the air at the surface of the basecoating composition is about 1.0 meters per second or less, and usually ranges from about 0.3 to about 0.5 meters per second. The temperature of the air is typically 10–35° C.

The volatilization or evaporation of volatile components from the base coat surface can be carried out in the open air, but is preferably carried out in a first drying chamber 18 in which air is circulated at low velocity to minimize airborne particle contamination as shown in FIG. 2. In a continuous process, the automobile body 16 is positioned at the entrance to the first drying chamber 18 and slowly moved therethrough in assembly-line manner at a rate which permits the volatilization of the base coat as discussed above. The rate at which the automobile body 16 is moved through the first drying chamber 18 and any other drying chambers discussed below depends in part upon the length and configuration of the drying chamber, but typically ranges from about 3 meters per minute to about 7.3 meters per minute for a continuous process. One skilled in the art would understand that, as shown in FIG. 2, individual dryers can be used for each step of the process or that a single dryer can be used, adjusting the air temperature and air speed for each step of the process. A non-limiting example of a suitable dryer is an ALTIVAR 66 blower, commercially available from Square D Corporation. Such a dryer 20 is shown in phantom in FIG. 2. The optional volatilization step may take place in the first drying chamber 18 and the automobile body 16 transported to a combination infrared/convection drying apparatus 28 as shown in FIG. 2 for subsequent steps of the process, or the volatilization and one or more subsequent steps may all be conducted in apparatus 28.

In step (b) of the process of the present invention, shown in FIG. 1 as 22, infrared radiation at a power density of 1.5–30.0 $kW/m^2$, preferably 2.5–20.0 $kW/m^2$, and a first air stream are applied simultaneously to the base coat composition such that a pre-dried base coat is formed upon the surface of the substrate.

The infrared radiation applied includes near-infrared region (0.7 to 1.5 micrometers) and intermediate-infrared region (1.5 to 20 micrometers) radiation, and usually ranges from about 0.7 to about 4 micrometers. The infrared radiation heats the Class A (external) surfaces of the coated substrate which are exposed to the radiation and preferably does not induce chemical reaction or crosslinking of the components of the base coat. Most non-Class A surfaces are not exposed directly to the infrared radiation but will be heated by conduction through the automobile body and random scattering of the infrared radiation, as well as from hot air convection.

Figure 3:
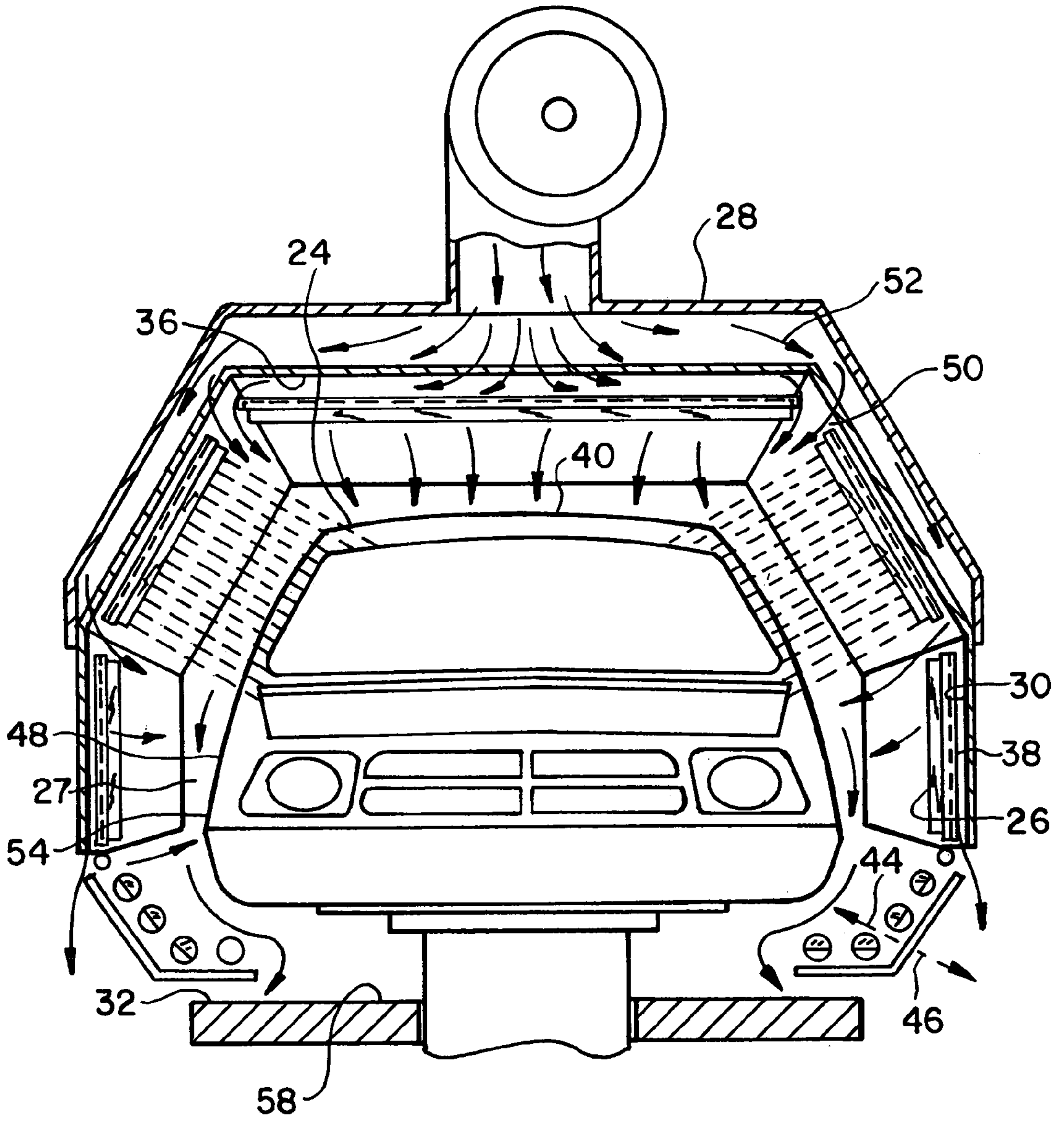
FIG. 3 is a front elevational view taken along line 3—3 of a portion of the schematic diagram of FIG. 2.

Referring now to FIGS. 2 and 3, the infrared radiation is emitted by a plurality of emitters 26 arranged in the interior drying chamber 27 of the combination infrared/convection drying apparatus 28. Each emitter 26 is typically a high intensity infrared lamp, most often a quartz envelope lamp having a tungsten filament. Useful short wavelength (0.76 to 2 micrometers), high intensity lamps include Model No. T-3 lamps such as are commercially available from General Electric Co., Sylvania, Phillips, Heraeus and Ushio and have an emission rate of between 75 and 100 watts per lineal inch at the light source. Medium wavelength (2 to 4 micrometers) lamps also can be used and are available from the same suppliers. The emitter lamp is generally rod-shaped and has a length that can be varied to suit the configuration of the oven, but generally is about 0.75 to about 1.5 meters long. The emitter lamps on the side walls 30 of the interior drying chamber 27 are arranged generally vertically with reference to ground 32, except for a few rows 34 (usually about 3 to about 5 rows) of emitters 26 at the bottom of the interior drying chamber 27 which are arranged generally horizontally to ground 32.

The number of emitters 26 can vary depending upon the desired intensity of energy to be emitted. In a typical arrangement, the number of emitters 26 mounted to the ceiling 36 of the interior drying chamber 27 is about 24 to about 32 arranged in a linear side-by side array with the emitters 26 spaced about 10 to about 20 centimeters apart from center to center, and usually about 15 centimeters. The width of the interior drying chamber 27 is sufficient to accommodate the automobile body or whatever substrate component is to be dried therein, and is typically about 2.5 to about 3.0 meters wide. Each side wall 30 of the chamber 27 typically has about 50 to about 60 lamps with the lamps spaced about 15 to about 20 centimeters apart from center to center. The length of each side wall 30 is sufficient to encompass the length of the automobile body or whatever substrate component is being dried therein, and usually is about 4 to about 6 meters. The side wall 30 typically has four horizontal sections that are angled to conform to the shape of the sides of the automobile body. The top section of the side wall 30 may have 24 parallel lamps divided into 6 zones. In one arrangement, the three zones nearest the entrance to the drying chamber 27 are operated at medium wavelengths, the three nearest the exit at short wavelengths. The middle section of the side wall 30 is configured similarly to the top section. The two lower sections of the side walls 30 each may contain 6 bulbs in a 2 by 3 array. The first section of bulbs nearest the entrance is usually operated at medium wavelength and the other two sections at short wavelengths.

Referring to FIG. 2, each of the emitter lamps 26 may be disposed within a trough-shaped reflector 38 that is formed from, for example, polished aluminum. Suitable reflectors include aluminum or integral gold-sheathed reflectors that are commercially available from BGK-ITW Automotive, Heraeus and Fannon Products. The reflectors 38 gather energy transmitted from the emitter lamps 26 and focus the energy on the automobile body 16 to lessen energy scattering.

Depending upon such factors as the configuration and positioning of the automobile body 16 within the interior drying chamber 27 and the color of the base coat to be dried, the emitter lamps 26 can be independently controlled by microprocessor (not shown) such that the emitter lamps 26 furthest from a Class A surface 24 can be illuminated at a greater intensity than lamps closest to a Class A surface 24 to provide uniform heating. For example, as the roof 40 of the automobile body 16 passes beneath a section of emitter lamps 26, the emitter lamps 26 in that zone can be adjusted to a lower intensity until the roof 40 has passed, then the intensity can be increased to heat the deck lid 42 which is at a greater distance from the emitter lamps 26 than the roof 40. Additionally, the emitter lamps 26 directed toward heavier gauge (thicker) substrates such as heavy metal rocker areas and hoods can be illuminated at a greater intensity than lamps directed toward body panels, which are made of thinner sheet metal, to provide uniform heating. For example, in a particular embodiment of the present invention, in step (b) of the process, the infrared radiation may be applied at a power density of 2.5–12.0 $kW/m^2$ to body panels and at up to 30.0 $kW/m^2$ to heavy metal rocker areas and hood areas of the automotive body.

Also, in order to minimize the distance from the emitter lamps 26 to the Class A surfaces 24, the position of the side walls 30 and emitter lamps 26 can be adjusted toward or away from the automobile body as indicated by directional arrows 44, 46, respectively, in FIG. 3. One skilled in the art would understand that the closer the emitter lamps 26 are to the Class A surfaces 24 of the automobile body 16, the greater the percentage of available energy which is applied to heat the surfaces 24 and coatings present thereon. Generally, the infrared radiation is emitted at a power density ranging from about 10 to about 30 kilowatts per square meter ($kW/m^2$) of emitter wall surface, and often about 12 $kW/m^2$ for emitter lamps 26 facing the sides 48 of the automobile body 16 (doors or fenders) which are closer than the emitter lamps 26 facing the hood and deck lid 42 of the automobile body 16, which usually emit about 24 $kW/m^2$. In one embodiment of the present invention, the infrared radiation is applied at a power density of 2.5–12.0 $kW/m^2$ to body panels and at up to 30.0 $kW/m^2$ to heavy metal rocker areas and hood areas of the automobile body 16.

A non-limiting example of a suitable combination infrared/convection drying apparatus is a BGK combined infrared radiation and heated air convection oven, which is commercially available from BGK Automotive Group of Minneapolis, Minn. The general configuration of this oven will be described below and is disclosed in U.S. Pat. Nos. 4,771,728; 4,907,533; 4,908,231; and 4,943,447. Other useful combination infrared/convection drying apparatus are commercially available from Durr of Wixom, Mich., Thermal Innovations of Manasquan, N.J., Thermovation Engineering of Cleveland, Ohio, Dry-Quick of Greenburg, Ind., and Wisconsin Oven and Infrared Systems of East Troy, Wis.

Referring now to FIGS. 2 and 3, the typical combination infrared/convection drying apparatus 28 includes baffled side walls 30 having nozzles or slot openings 50 through which air 52 is passed to enter the interior drying chamber 27.

The temperature of the first air stream 52 applied in step (b) is usually 30 to 65° C., often 37 to 55° C. The air 52 is supplied by a blower 56 or dryer and can be preheated externally or by passing the air over the heated infrared emitter lamps 26 and their reflectors 38. By passing the air 52 over the emitters 26 and reflectors 38, the working temperature of these parts can be decreased, thereby extending their useful life. The air 52 can also be circulated up through the interior drying chamber 27 via the subfloor 58. The air flow may advantageously be recirculated to increase efficiency. A portion of the air flow can be bled off to remove contaminants and supplemented with filtered fresh air to make up for any losses.

The velocity of the first air stream 52 is typically 0.5 to 5.0 m/s, often 0.5 to 1.0 m/s. During step (b), the substrate is heated by the infrared radiation and first air stream at a first rate ranging from 0.05° C. per second to 0.6° C. per second (usually 0.17° C. per second to 0.58° C. per second). When the substrate is metal, such as an automobile body 16, a first peak metal temperature is achieved ranging from 25° C. to 60° C., more typically 28° C. to 55° C. As used herein, "peak metal temperature" means the target instantaneous temperature to which the metal substrate must be heated. The peak metal temperature for a metal substrate is measured at the surface of the coated substrate approximately in the middle of the side of the substrate opposite the side on which the coating is applied. The peak temperature for a polymeric substrate is measured at the surface of the coated substrate approximately in the middle of the side of the substrate on which the coating is applied. It is preferred that this peak metal temperature be maintained for as short a time as possible to minimize the possibility of crosslinking of the base coat.

The duration of step (b) is usually 30 to 90 seconds.

In step (c) of the process of the present invention, shown in FIGS. 1 and 2 as 60, a second air stream is applied to the base coat composition in the absence of infrared radiation such that a dried base coat 62 is formed upon the surface of the substrate. By "dried" is meant that the base coat is dehydrated (and volatile organics removed) to a solids content of about 80 to 95% solids by weight. Step (c) of the process may take place in any of the drying chambers mentioned above or in a separate drying chamber to which the substrate is transported as part of a continuous process.

The temperature of the second air stream applied in step (c) is usually 35–110° C., often 40–110° C., and more often 93 to 107° C. The velocity of the second air stream is typically 1.5 to 16.0 m/s, often 3.0 to 4.5 m/s. During step (c), the temperature of the substrate is increased at a second rate ranging from 0.1° C. per second to 0.6° C. per second (usually 0.1° C. per second to 0.3° C. per second). If the substrate is metal, a second peak metal temperature ranging from 36° C. to 70° C., more typically 39° C. to 55° C., is achieved. Note that no substantial curing takes place during step (c); the air and peak metal temperatures are not typically high enough for crosslinking reactions to occur.

The duration of step (c) is usually 50 to 200 seconds, more often 90 to 180 seconds.

In one embodiment of the invention, an additional step 64 may be performed immediately after step (c), wherein hot air 66 is applied to the dried base coat to achieve a peak metal temperature of 110–150° C. for a period of at least six minutes, such that a cured base coat is formed upon the surface of the metal substrate. As used herein, "cure" means that any crosslinkable components of the dried base coat are substantially crosslinked.

In a preferred embodiment of the invention, the process further comprises the additional step of (d) applying a transparent topcoat or clear coat composition over the dried base coat, shown in FIG. 1 as 68. The topcoat composition may be any solventborne, waterborne, or powder composition known to those skilled in the art, and typically include film-forming resins and crosslinking agents such as those disclosed above with respect to the base coat composition. Suitable solventborne compositions include those disclosed in U.S. Pat. No. 6,365,699. Suitable waterborne compositions include those disclosed in U.S. Pat. No. 6,270,905. A "powder" topcoating composition is meant to include topcoating compositions comprising dry powders and powders that are slurried in a solution, such as water. Suitable powder slurry topcoating compositions include those disclosed in International Publications WO 96/32452 and 96/37561, European Patents 652264 and 714958, and Canadian Patent No. 2,163,831. Other suitable powder topcoats are described in U.S. Pat. No. 5,663,240 and include epoxy functional acrylic copolymers and polycarboxylic acid crosslinking agents. The topcoat can be applied by any means as disclosed above with respect to application of the base coat composition, such as by electrostatic spraying using a gun or bell at 60 to 80 kV, 80 to 120 grams per minute to achieve a film thickness of about 50–90 microns, for example.

Preferably the topcoating composition is a crosslinkable coating comprising at least one thermosettable film-forming material and at least one crosslinking material such as are described above. The topcoating composition can include additives such as are discussed above, but generally not pigments. The amount of the topcoating composition applied to the substrate can vary based upon such factors as the type of substrate and intended use of the substrate, i.e., the environment in which the substrate is to be placed and the nature of the contacting materials.

Between steps (c) and (d), it may be desirable to perform an additional, optional step 66 of cooling the substrate having the dried base coat thereon to a temperature of 20–30° C. before application of the topcoat.

By controlling the rate at which the substrate temperature is increased and the peak metal temperature, the combination of steps (b) and (c) can provide waterborne base coat and clear topcoat composite coatings with a minimum of flaws in surface appearance, such as pops and bubbles. Also, high film builds can be achieved in a short period of time with minimum energy input and the flexible operating conditions can decrease the need for spot repairs.

The dried base coat that is formed upon the surface of the automobile body 16 is dried sufficiently to enable application of the topcoat such that the quality of the topcoat will not be affected adversely by further drying of the base coat. For waterborne base coats, "dry" means the almost complete absence of water from the base coat. If too much water is present, the topcoat can crack, bubble, or "pop" during drying of the topcoat as water vapor from the base coat attempts to pass through the topcoat. The base coat composition is typically dried to a solids content of 92 to 98 percent by weight prior to the application of a powder topcoat composition in step (d), and to a solids content of 75 to 88 percent by weight prior to the application of a liquid topcoat composition in step (d).

In a preferred embodiment, the process of the present invention further comprises a step 70 (shown in FIG. 1) of curing the topcoating composition after application over the dried base coat. The thickness of the dried and crosslinked composite coating is generally about 0.2 to 5 mils (5 to 125 micrometers), and is usually about 0.4 to 4 mils (10 to 100 micrometers). The topcoating can be cured by hot air convection drying and, if desired, infrared heating, such that any crosslinkable components of the topcoating are crosslinked to such a degree that the automobile industry accepts the coating process as sufficiently complete to transport the coated automobile body without damage to the topcoat. The topcoating can be cured using any conventional hot air convection dryer or combination convection/infrared dryer, such as are discussed above. Generally, the topcoating is heated to a temperature of about 140° C. to about 155° C. for a period of about 25 to about 30 minutes to cure the topcoat.

Note that if the base coat was not cured prior to applying the topcoat, both the base coat and the topcoating composition can be cured together by applying hot air convection and/or infrared heating using apparatus such as are described in detail above to cure both the base coat and the topcoat composition. To cure the base coat and the topcoat composition, the substrate is generally heated to a temperature of about 140° C. to about 155° C. for a period of about 25 to about 30 minutes to cure the topcoat.

In an alternative embodiment of the present invention, a semi-batch process for coating a substrate is provided, comprising the steps of:

(a) in a first location, applying a waterborne base coat composition to a surface of the substrate;

(b) transporting the substrate to a second location and applying infrared radiation at a power density of 1.5–30.0 $kW/m^2$ and a first air stream simultaneously to the base coat composition for a period of 30 to 60 seconds such that a pre-dried base coat is formed upon the surface of the substrate; and (c) in the same second location, applying infrared radiation at a power density of 3.0 to 30.0 $kW/m^2$ and a second air stream simultaneously to the base coat composition for a period of 30 to 90 seconds such that a dried base coat is formed upon the surface of the substrate.

In this embodiment of the invention, the base coat applied to the substrate in step (a) may be any of those disclosed above, using the same process conditions.

Immediately following the application of the base coat in this embodiment, an air stream may optionally be applied to the base coat composition for a period of at least one minute to volatilize at least a portion of volatile material from the base coat composition, allowing the base coat to set. The velocity of the first air stream applied in step (b) at the surface of the basecoating composition is in the range of 0.5 to 2.5 m/s.

The speed of the second air stream applied in step (c) is typically in the range of 4.0 to 16.0 m/s, and the temperature of the air streams applied in steps (b) and (c) is typically 95–150° F. (35–66° C.).

In this embodiment, when the substrate is metal, an additional step may optionally be performed immediately after step (c) wherein hot air is applied to the dried base coat to achieve a peak metal temperature of 110–150° C. for a period of at least six minutes, such that a cured base coat is formed upon the surface of the substrate.

The process of this embodiment of the invention may further comprise the additional step of (d) applying a transparent topcoat composition over the dried base coat. The topcoat composition may be any solventborne, waterborne, or powder composition known to those skilled in the art, as disclosed above.

Again, a step of curing the topcoating composition after application over the dried base coat may be included in this embodiment of the invention. Process conditions may be the same as those disclosed above.

If the base coat was not cured prior to applying the topcoat, both the base coat and the topcoating composition can be cured together by applying hot air convection and/or infrared heating using apparatus and conditions such as are described in detail above to cure both the base coat and the topcoat composition.

The present invention will further be described by reference to the following example. The following example is merely illustrative of specific embodiments of the invention and is not intended to limit the scope of the invention. Unless otherwise indicated, all parts are by weight.

EXAMPLE

In this example, steel test panels were coated with a liquid base coat and liquid clearcoat as specified below to evaluate a drying process according to the present invention. The test substrates were cold rolled steel panels, commercially available from ACT Laboratories, Hillsdale, Mich., size 30.48 cm by 45.72 cm (12 inch by 18 inch) and also 10.16 cm by 30.48 cm (4 inch by 12 inch) electrocoated with a cationically electrodepositable primer commercially available from PPG Industries, Inc. as ED-5000. Commercial waterborne base coat LM Silver, which is commercially available from PPG Industries, Inc., was spray applied using an automated spray (bell) applicator at 45,000 rpm, 70,000 Volts, 2.0 bar of shaping air pressure for the first coat, 4.9 meters/minute line speed, 30"–45" #4 Ford cup viscosity. After a 30 second flash, the second coat was applied by dual air atomization spray guns with a 50.8 cm (20 inch) spray fan pattern at 19 strokes/minute. The coatings were applied and flashed at 64% relative humidity and 23° C. to give a dry film thickness as specified in Table I below. The base coat coating on the panels was dried as specified in the Table I using a combined infrared radiation and heated air convection oven commercially available from BGK-ITW Automotive Group of Minneapolis, Minn. The panels were then topcoated with liquid HiTech® clearcoat, HP-1, (commercially available from PPG Industries, Inc.) and both the base coat and clear coat were simultaneously cured for 30 minutes: 7 minutes in a Black Wall Radiant zone at 155° C. (310° F.) followed by 23 minutes using hot air convection at 118° C. (245° F.) to give an overall film thickness of about 75 to 103 micrometers. Appearance data are provided in Table II.

TABLE I

| | H | | V |
|---|---|---|---|
| Dry Film Thickness Base coat (mil) | 0.5–0.7 | | 0.4–0.6 |
| FLASH STEP | | | |
| Time (sec) | | 30 | |
| SET STEP (b) | | | |
| Time (sec) | | 30 | |
| IR Watt Density (kW/sq. m.) | 4.2 | | 3.75 |
| Air Temp. | | 52° C. (125° F.) | |
| Air Flow Rate (m/sec) | | 0.5–2.5 | |
| Peak Metal Temp. | 29° C. (84° F.) | | 30° C. (86° F.) |
| Peak Metal Heating Rate (degrees/sec) | 0.2° C. (0.33° F.) | | 0.23° C. (0.4° F.) |
| DRYING STEP (c) | | | |
| Time (sec) | | 90 | |
| IR Watt Density (kW/sq. m.) | 0 | | 0 |
| Average Air Temp. | | 107° C. (225° F.) | |
| Air Flow Rate (m/sec) | | 1.0–5.0 | |
| Peak Metal | 39° C. | | 46° C. |

TABLE I-continued

| | H | V |
|---|---|---|
| Temp. | (102° F.) | (115° F.) |
| Peak Metal Temperature | 0.11° C. | 0.18° C. |

Note that "H" indicates panels coated in a horizontal orientation, while "V" indicates panels coated in a vertical orientation.

TABLE II

| | | | Appearance | | * BYK | | |
|---|---|---|---|---|---|---|---|
| | Foil | | Orange | | WaveScan | | |
| Horizontal or Vertical | Solids % | Pops | Peel Rating | Overall Rating | Long Wave | Short Wave | Tension |
| H | 83 | NO | 47 | 44 | 7 | 21 | 18.2 |
| V | 83 | NO | 33 | 39 | 15.7 | 24 | 14.8 |

* Byk WaveScan from Byk-Gardner International
US Hdqtrs. Silver Spring, Maryland
The instrument measures surface roughness and smoothness by optical variation
Longwave: numbers 0 to 50, the lower, the better.
Shortwave: numbers 0–50, the lower, the better.
Tension: Numbers 0 to 19, the higher, the better.

I claim:

1. A process for coating a substrate, comprising the steps of:

(a) applying a waterborne base coat composition to a surface of the substrate;

(b) applying infrared radiation at a power density of 2.5 to 12.0 kW/m$^2$ and a first air stream simultaneously to the base coat composition such that a pre-dried base coat is formed upon the surface of the substrate;

(c) applying a second air stream in the absence of infrared radiation to the base coat composition such that a dried base coat is formed upon the surface of the substrate;

(d) applying a topcoat composition over the dried base coat; and (e) curing the topcoat composition after step (d).

2. The process according to claim 1, wherein the solids content of the waterborne base coat composition ranges from 18 to 50 percent by weight, based on the total weight of the base coat composition.

3. The process according to claim 1, wherein the topcoat composition applied in step (d) is a powder composition.

4. The process according to claim 3, wherein the base coat composition is dried to a solids content of 92 to 98 percent by weight prior to the application of the powder topcoat composition in step (d).

5. The process according to claim 1, wherein the topcoat composition applied in step (d) is a liquid composition.

6. The process according to claim 5, wherein the base coat composition is dried to a solids content of 75–88 percent by weight prior to the application of the liquid topcoat composition in step (d).

7. The process according to claim 1, wherein the first air stream is applied in step (b) at a temperature of 30–65° C.

8. The process according to claim 1, wherein the substrate is metal and during step (b) a first temperature of the substrate is increased at a first rate ranging from 0.05° C. per second to 0.6° C. per second to achieve a first peak metal temperature ranging from 25° C. to 60° C.

9. The process according to claim 8, wherein during step (b) the first temperature of the substrate is increased at a first rate ranging from 0.17° C. per second to 0.58° C. per second to achieve a first peak metal temperature ranging from 28° C. to 55° C.

10. The process according to claim 1, wherein the second air stream is applied in step (c) at a temperature of 35–110° C.

11. The process according to claim 1, wherein the substrate is metal and during step (c) a second temperature of the substrate is increased at a second rate ranging from 0.1° C. per second to 0.6° C. per second to achieve a second peak metal temperature ranging from 36° C. to 70° C.

12. The process according to claim 11, wherein during step (c) the second temperature of the substrate is increased at a second rate ranging from 0.1° C. per second to 0.3° C. per second to achieve a second peak metal temperature ranging from 39° C. to 55° C.

13. The process according to claim 1, wherein the substrate is a metal substrate selected from the group consisting of iron, aluminum, copper, magnesium, zinc, and alloys and combinations thereof.

14. The process according to claim 13, wherein the metal substrate is an automotive body component.

15. The process according to claim 1, wherein the first air stream has a temperature of 37° C. to 55° C. in step (b).

16. The process according to claim 1, wherein step (b) has a duration of 30 to 90 seconds.

17. The process according to claim 1, wherein the velocity of the first air stream is 0.5 to 5 m/s in step (b).

18. The process according to claim 1, wherein the infrared radiation is applied at a wavelength of 0.7–20 micrometers in step (b).

19. The process according to claim 18, wherein the infrared radiation is applied at a wavelength of 0.7–4 micrometers in step (b).

20. The process according to claim 1, wherein the second air stream has a temperature of 40° C. to 110° C. in step (c).

21. The process according to claim 1, wherein step (c) has a duration of 50 to 200 seconds.

22. The process according to claim 1, wherein the velocity of the second air stream is 1.5 to 16.0 m/s in step (c).

23. The process according to claim 1, further comprising an additional step of applying air having a temperature of 10–35° C. to the base coat composition for a period of at least 30 seconds between steps (a) and (b) to volatilize at least a portion of volatile material from the base coat composition, the velocity of the air at the surface of the base coat composition being 1.0 m/s or less.

24. The process according to claim 1, wherein the substrate is metal and the process further comprises an additional step after step (c) of applying hot air to the dried base coat to achieve a peak metal temperature of 110–150° C. such that a cured base coat is formed upon the surface of the metal substrate.

25. The process according to claim 1, further comprising an additional step of simultaneously curing the base coat composition and the topcoat composition after step (d).

26. The process according to claim 1, wherein each step of the process occurs in a separate location as part of a continuous process.

27. The process according to claim 1, wherein each step of the process occurs in a single location as part of a batch process.

28. The process according to claim 1, wherein steps (b) and (c) of the process occur in a single location as part of a semi-batch process.

29. The process of claim 1, wherein the infrared radiation is emitted at a wavelength ranging from 0.76 to 2 micrometers.

30. A process for coating a substrate, comprising the steps of:

(a) applying a waterborne base coat composition to a surface of the substrate;

(b) applying infrared radiation at a power density of 2.5 to 12.0 $kW/m^2$ and a first air stream simultaneously to the base coat composition such that a pre-dried base coat is formed upon the surface of the substrate;

(c) applying a second air stream in the absence of infrared radiation to the base coat composition such that a dried base coat is formed upon the surface of the substrate;

(d) applying a topcoat composition over the dried base coat; and (e) cooling the substrate having the dried base coat thereon to a temperature of 20–30° C. between steps (c) and (d).

31. A semi-batch process for coating a substrate, comprising the steps of:

(a) in a first location, applying a waterborne base coat composition to a surface of the substrate;

(b) transporting the substrate to a second location and applying infrared radiation at a power density of 2.5 to 12.0 $kW/m^2$ and a first air stream simultaneously to the base coat composition for a period of 30 to 60 seconds such that a pre-dried base coat is formed upon the surface of the substrate; and (c) in the same second location, applying infrared radiation at a power density of 2.5 to 20.0 $kW/m^2$ and a second air stream simultaneously to the base coat composition for a period of 30 to 90 seconds such that a dried base coat is formed upon the surface of the substrate.

32. The semi-batch process of claim 31, wherein the speed of the first air stream applied in step (b) is in the range of 0.5 to 2.5 m/s.

33. The semi-batch process of claim 31, wherein the speed of the second air stream applied in step (c) is in the range of 4.0 to 16.0 m/s.

34. The semi-batch process of claim 31, wherein the temperature of the air streams applied in steps (b) and (c) is 95–150° F. (35–66° C.).

35. The process of claim 31, wherein the infrared radiation is emitted at a wavelength ranging from 0.76 to 2 micrometers.

* * * * *